Nov. 13, 1951        C. L. VOLFF ET AL        2,574,514
HIGH-FREQUENCY UNIT FOR INERT GAS ARC WELDING
Filed April 25, 1949        2 SHEETS—SHEET 1
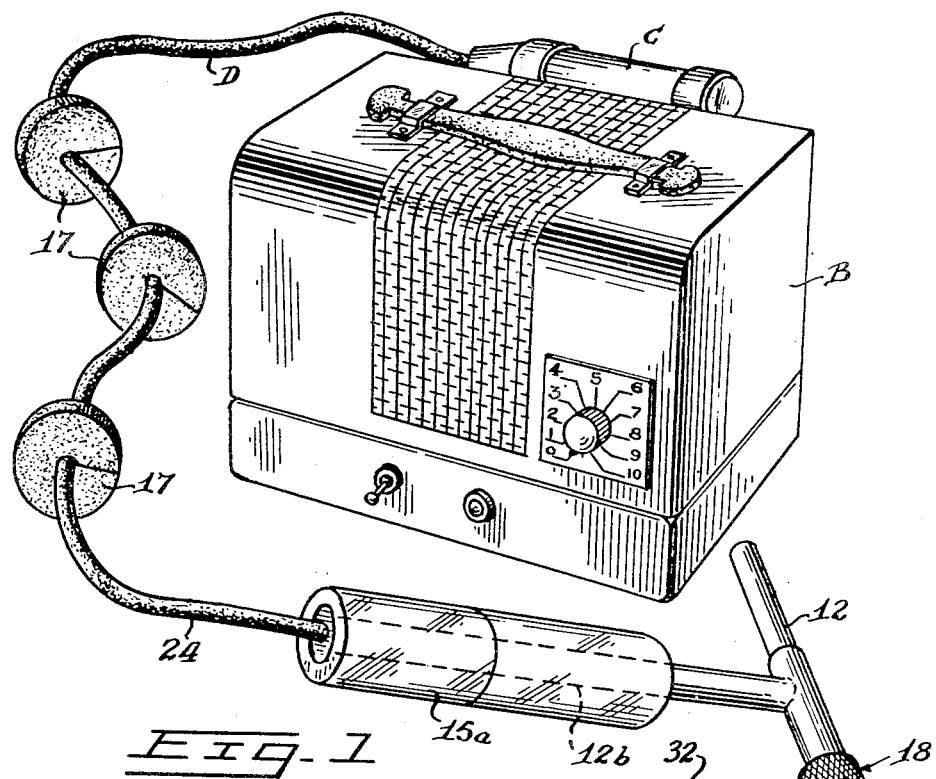
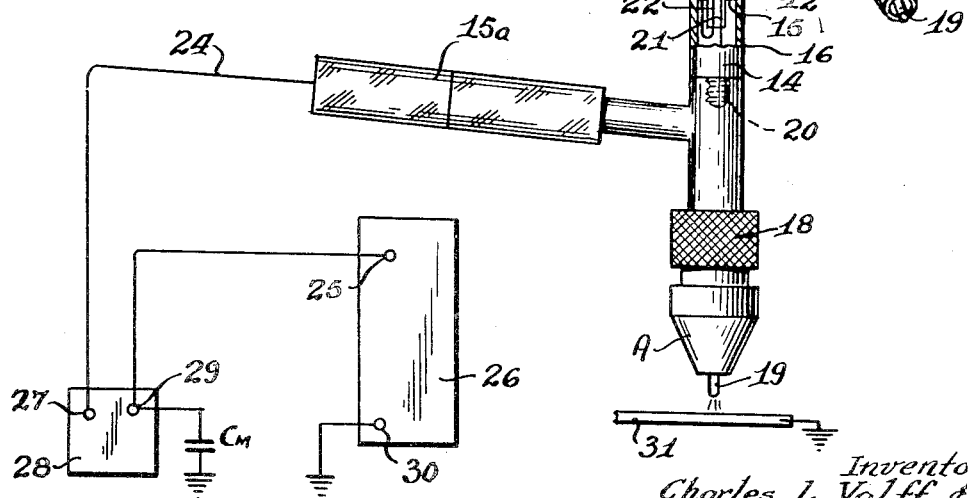
Inventors
Charles L. Volff &
Julius Hammerslag
By Alan Aroben
Attorney

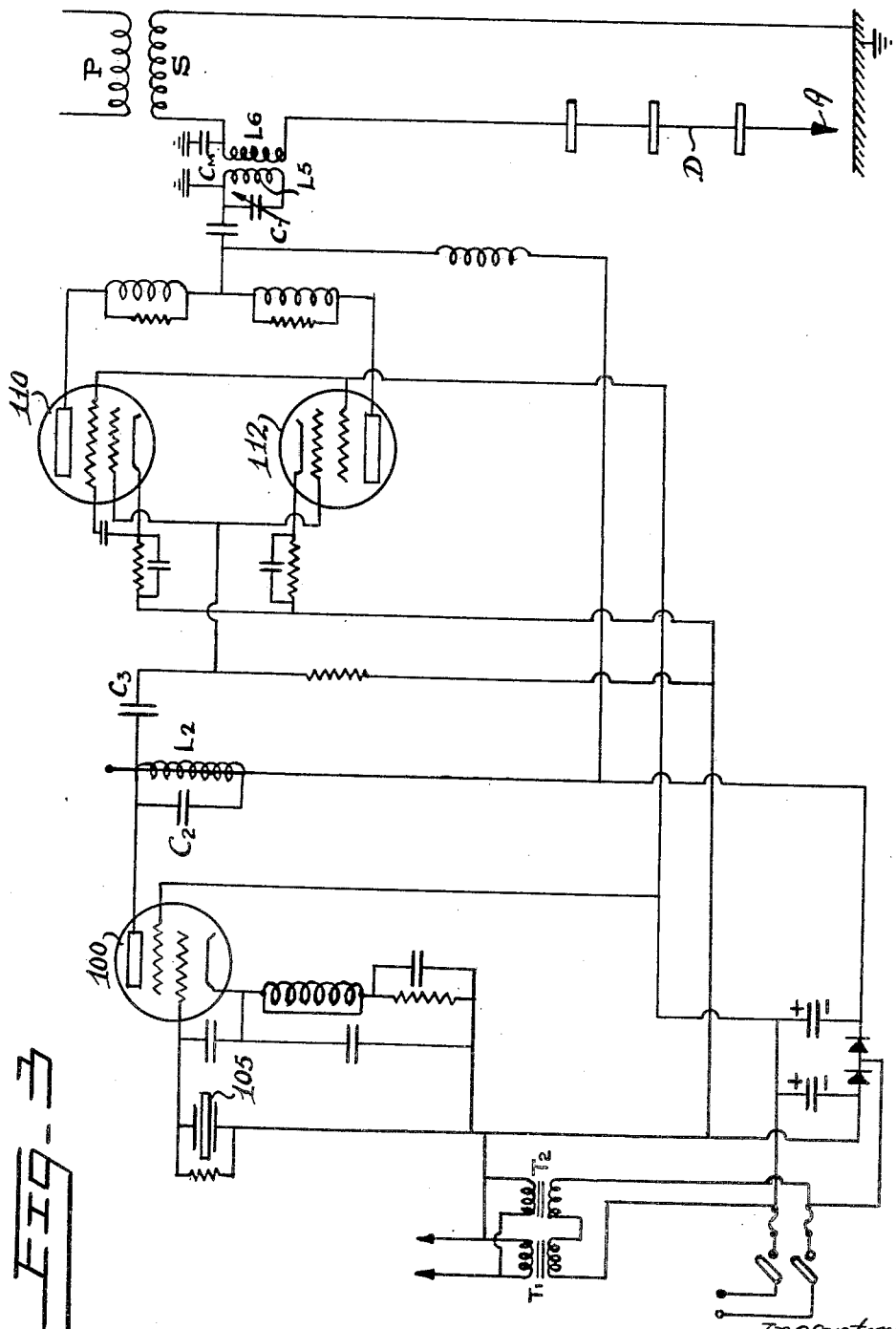

Patented Nov. 13, 1951

2,574,514

UNITED STATES PATENT OFFICE 2,574,514

HIGH-FREQUENCY UNIT FOR INERT GAS ARC WELDING

Charles L. Volff, Montreal, Quebec, and Julius Hammerslag, Outremont, Quebec, Canada, assignors to L'Air Liquide Societe Anonyme Pour l'Etude et l'Exploitation des Procedes Georges Claude, Paris, France, a body corporate Application April 25, 1949, Serial No. 89,458

4 Claims. (Cl. 315—166)

Introduction

This invention relates to improvements in procedure and in apparatus for inert gas arc welding.

More specifically, the invention relates to inert gas arc welding apparatus and procedure in which there is employed a welding torch, means for furnishing normal alternating welding current to the torch and means for furnishing a high frequency alternating current for striking and sustaining the arc or both.

It is known that when using an alternating current to weld metal with a shield of an inert gas, it is necessary to stabilize the arc by the use of high-frequency alternating current superimposed on ordinary alternating current. Generally this high-frequency current is produced by an air gap oscillator. One of the drawbacks to this type of oscillator is that the high-frequency oscillations interfere with neighboring radio receiving stations so that this type has thus been generally condemned by authorities. Accordingly, the authorities have assigned certain permissible narrow wave bands within which such high-frequency arc-sustaining current may be employed. One such band is between 13.55322 and 13.56678 megacycles.

The generation and use of this very high frequency presents problems heretofore foreign to the welding art. Ordinary generating means used in welding, for example, the spark gap oscillator, cannot be employed. An electronic means of high-frequency arc-sustaining A. C. must be used. The problems here are to fix the frequency within the narrow limits prescribed, to utilize a power input sufficiently low to render the apparatus economic but at the same time sufficiently high to be of value in sustaining the arc.

Normally, one skilled in the welding art would not expect to be able to achieve these functions with an electronic high-frequency continuous wave generating apparatus.

Some attempts have been made to use electronic apparatus to generate and superimpose pulses of high frequency on the weeding current. But impractically complicated means are necessary to synchronize these pulses with the phase of the welding current and even then radio broadcasting interference generally results.

Applicant's development

Having regard to the foregoing, the applicants have developed an apparatus in which the electronic means is capable of producing continuous A. C. at a frequency within a given very high frequency band and of supplying this high frequency current to the electrode holder to strike or sustain the arc without emitting broadcast-interfering radiations.

The electronic means includes a generator having a vacuum tube oscillator stabilized by a crystal and amplified by at least one amplification circuit. The high frequency current is fed from the generator to the welding circuit through a transformer. The electronic means is calibrated to produce its high frequency current at a frequency considerably higher than broadcast frequency and in a band of frequency permissible for industrial apparatus. In accordance with the invention, means is also provided for tuning the entire electronic circuit including the vacuum tube oscillator, the welding circuit and the generator of the welding circuit. The apparatus by this construction provides at least for striking the arc, in the case where direct current is used for welding, or for both striking and sustaining the arc where alternating current is used for welding, a maximum power output at the end of the welding circuit adjacent to the electrode holder and a minimum of radiation at the welding circuit.

Further, in accordance with the invention means is provided adjacent to the welding electrode holder for indicating the power given to the electrode holder by the H. F. arc-sustaining unit, and means is included for adjusting the power from the H. F. arc-sustaining unit to the electrode holder. The indicating means is preferably a luminous electric discharge device.

The length of the welding cable may also be adjusted in accordance with the frequency so as to maintain the loss of power under a certain maximum. For example, it has been found that the length of the welding cable from the unit to the torch should preferably be susbtantially ⅛ the wave length or substantially an odd multiple thereof. Additionally, means may be provided for protecting the cable from the ground or grounded conductive objects, preferably this means including rings of non-conductive material surrounding the cable, as well as insulating means surrounding the handle of the torch.

Detailed description

Having thus generally described the invention, reference will now be made to the accompanying drawings illustrating a preferred apparatus in which it is embodied, and in which:

Figure 1 is a schematic diagram showing the general arrangement of the preferred apparatus.

Figure 2 is a diagrammatic view showing details of the torch and current indicating means.

Figure 3 is a wiring diagram showing the electronic features of the apparatus.

Referring more particularly to the drawings, A is the welding torch, B the electronic unit for supplying welding and arc-sustaining A. C. and also including a lead-in unit C for the gases used in the welding operation and cooling water. D is a cable leading from the units B and C to the torch. The torch is provided with a welding tip 19, an indicating head 12, and handle 12b. Around the handle 12b is an additional insulating cover 15a preferably of a plastic material like "Lucite" capable of shielding the unit from loss of H. F. The cable is provided with a number of rings, preferably split rings, of rubber or other insulating material 17 which are adapted to prevent contact of the cable with the ground or grounded objects. This serves the same purpose as a coaxial cable which would be impractical on the scale required for carrying welding current. The length of the cable has been found to be of importance to the present invention. The cable should preferably be substantially ⅛ of the wave length or substantially an odd multiple thereof. In the case of a wave length corresponding to a frequency between 13.55322 and 13.56678 megacycles, the cable should preferably be between 7 to 11 feet.

As more clearly indicated in Figure 2, the torch includes an electrode holder 18 of the type commonly used for inert gas welding. The electric cable 24 or D which enters the handle is connected, one end to the electrode 19 and the other to the terminal 27, of the source 28 of the high-frequency current. The terminal 29 of the source 28 is connected to the terminal 25 of the source 26 of the low-frequency current. The terminal 29 is also connected to a condenser. The condenser, the second terminal 30 of the source of A. C. current 26 and the work-piece 31 are also grounded. The terminals 29 and 30 may also be connected to the work-piece by a lead. In a part of the electrode holder 18 connected to the electrode 19 there is a tapped hole 20 and a luminous discharge apparatus 13 is screwed into this hole. The main purpose of this discharge apparatus is to permit the high-frequency unit to be tuned or adjusted for maximum or desired signal strength at the torch i. e., the electrode holder. This tapped hole also serves to conduct the current to the electrode 21 of the discharge apparatus which is connected to the welding electrode 19. The discharge apparatus in the preferred form of the device is a glow tube having its stabilization resistance in the base. This tube is mounted in a shield 12 having a base 14, a transparent casing 16 and a ring 15, and an insulating cover 32 having a metal plate 23 attached on the inside. The base 14 is metallic and screws in the threaded hole 20. The base is connected to the electrode 21 which thus has the voltage of the welding electrode 19. The metal plate 23 is connected to the other electrode 22 of the tube 13 and allows for the capacitive connection of this electrode to the ground through the cover 32 which also protects it mechanically while allowing observation of the light which it gives.

This casing holds the lamp 13 in place with the aid of the ring 15 which is preferably transparent.

For carrying out the adjustment of the source of high frequency the operator has only to place the cover 32 in the neighborhood of the piece to be welded, for example, and to seek the position of the adjustment regulating parts of the source of high frequency which gives from the tube 13 the amount of light corresponding to the welding conditions desired. Once this adjustment is made, the operator moves the cover 32 away from the work-piece thereby stopping the lamp from tapping the current and leaving all the high-frequency current for the welding. The operator can also place his hand on the cover when the electrode holder is in the vicinity of the place where he is working and have the adjustments made at the source.

The lamp 13 can be removed by base 14 from its shield.

*Preferred electronic apparatus*

The achievement of a very high frequency A. C. sharply within a permissible band and at a relatively low power input is a problem.

A preferred high-frequency generator for this apparatus is shown in Figure 3 as an electronic type crystal-controlled apparatus.

This generator includes a straight oscillating circuit, equipped with an oscillator tube 100 controlled by a crystal 105. The plate load is controlled by the condenser C2 and the inductance L2, the latter being variable to give optimum load to the plate of tube 100.

The amplifier circuit consists of two tubes 110 and 112 connected in parallel, the condenser C3 conveying the signal from the oscillator to the amplifier circuit. The amplified signal is brought to a tuned circuit including the inductance L5 and the condenser C7. This circuit is tuned to twice the frequency at which the crystal 105 oscillates so that only the first harmonic is allowed to pass to the output of the unit. The generator is so calibrated as to be capable of generating a high-frequency signal in a band width preferably not more than about one one thousandth ($1/1000$) of the wave length, which is 13,5 kilocycles in the case of the wave band indicated above, and of generating a signal of a power about 100 watts for example.

It will be understood that the invention has been described in its preferred aspects and that various modifications may be made within the purview of the claims without departing from the spirit of the invention.

We claim:

1. An arc welding apparatus comprising, an electrode holder, means for furnishing normal welding current to the electrode holder and electronic means for furnishing continuous high frequency current to the electrode holder, said electronic means including a generator having a vacuum tube oscillator stabilized by a crystal and amplified by at least one amplification circuit fed to the welding circuit through a transformer, said electronic means being calibrated to produce high frequency current in a band of frequency permissible for industrial apparatus, and means for tuning the entire electronic circuit including the vacuum tube oscillator, the welding circuit, and said means for furnishing welding current thereby to obtain at least for striking the arc a maximum power output at the end of the welding circuit adjacent to the electrode holder and a minimum of radiation at the welding circuit.

2. An arc welding apparatus according to claim 1 in which said means for furnishing welding current is a transformer and said electronic means is adapted both to strike and sustain the arc.

3. An apparatus according to claim 1 in which the tuning means includes a device for indicating visually the amount of high frequency power being given to the electrode holder.

4. An arc welding apparatus according to claim 1 in which the tuning means includes a luminous electric discharge apparatus for indicating the amount of the high frequency power being given to the electrode holder.

CHARLES L. VOLFF.
J. HAMMERSLAG.

REFERENCES CITED

The following references are of record in the file of this patent:

UNITED STATES PATENTS

| Number | Name | Date |
| --- | --- | --- |
| 1,884,950 | Woodring | Oct. 25, 1932 |
| 2,017,897 | Emersleben | Oct. 22, 1935 |
| 2,358,352 | Sherwood | Sept. 19, 1944 |
| 2,363,332 | Jennings et al. | Nov. 21, 1944 |
| 2,395,062 | Nielsen | Feb. 19, 1946 |